US006439473B1

United States Patent
Meyer et al.

(10) Patent No.: US 6,439,473 B1
(45) Date of Patent: Aug. 27, 2002

(54) DEVICE AND METHOD FOR MONITORING THE AMOUNT OF MATERIAL APPLIED TO A SURFACE

(76) Inventors: Bradley O. Meyer, 7005 112th Ave. S., Horace, ND (US) 58047; Timothy J. Marthe, 3660 46th St. N., Fargo, ND (US) 58102

(*) Notice: Subject to any disclaimer, the term of this patent is extended or adjusted under 35 U.S.C. 154(b) by 0 days.

(21) Appl. No.: 09/545,534

(22) Filed: Apr. 7, 2000

Related U.S. Application Data (60) Provisional application No. 60/128,584, filed on Apr. 9, 1999.

(51) Int. Cl.[7] ............................................. A01G 25/16
(52) U.S. Cl. ......................................... 239/69; 239/172
(58) Field of Search ............................ 239/74, 69–71, 239/67, 159, 170, 172, 150; 404/93, 94

(56) References Cited

U.S. PATENT DOCUMENTS 4,093,107 A * 6/1978 Allman et al. ............ 239/74 X
5,310,114 A * 5/1994 Cann ........................... 239/74
2001/0002036 A1 * 5/2001 Nystrom .................... 239/69 X

FOREIGN PATENT DOCUMENTS

| EP | 0462899 | 12/1991 |
| EP | 537857 A2 | * 4/1993 |
| EP | 0747533 | 12/1996 |
| GB | 2304910 | 3/1997 |

OTHER PUBLICATIONS

EZ–Liner® Article, "New Industry Requirements Make Data Acquisition System Successful," *On Line*, Spring 2000, vol. 35, Issue 1.

* cited by examiner

*Primary Examiner*—Lesley D. Morris
(74) *Attorney, Agent, or Firm*—Fish & Richardson P.C., P.A.

(57) ABSTRACT

The present invention is a device and method for monitoring the amount of paint or beads being applied by a paint truck to a road or other surface. Paint and/or bead storage tanks are mounted on weigh bars. By taking periodic measurements of the weight of the storage tanks and by correlating that data with the distance of the road or other surface painted, an operator is able to ensure that the amount of paint and/or beads being applied is within a desired specification.

9 Claims, 6 Drawing Sheets

DEVICE AND METHOD FOR MONITORING THE AMOUNT OF MATERIAL APPLIED TO A SURFACE

RELATED APPLICATIONS

This application claims priority from U.S. Provisional Application Serial No. 60/128,584 filed Apr. 9, 1999.

TECHNICAL FIELD

The present invention relates to pavement marking. More particularly, the invention relates to the application of pavement marking materials to a road, runway, or any other type of surface by a moving vehicle.

BACKGROUND

It is well known that roadways, runways and other types of surfaces need to have lines or intermittent stripes painted on them to guide traffic, airplanes, etc. A pavement marking material such as, for example, conventional paint, epoxy, or thermoplastic (referred to herein generally as "paint") is used to create a visible stripe paint line. Glass beads are applied to the freshly painted surface immediately after the pavement marking material is applied. The glass beads serve to make the stripes or lines more visible because they reflect light, such as from a vehicle's headlights.

Typically, a flatbed truck is configured to carry all the necessary supplies and equipment so that pavement marking material and beads can be applied to the road surface in an economical fashion. An average truck used to apply beads and pavement marking materials, referred to herein as a paint truck, has 2 pavement marking material ("paint") tanks of approximately 250 gallons each and 1 bead tank. The bead tank is usually large enough to hold sufficient beads for application to the pavement marking materials in the paint tanks. In operation, paint trucks may travel as fast as 25 mph while painting continuous or intermittent paint lines on the road surface.

"Airless" and "atomized air" are the "systems" most frequently used to apply paint. Beads are generally applied using "pressure pot" systems. Regardless which system or combination of systems is being used, the equipment for the systems is typically mounted on a flatbed truck.

In an airless system, the paint is delivered to a high pressure pump, usually a piston pump, which pumps the paint through a small nozzle on the end of a paint gun without mixing air with the paint, and thereby creates the paint line on the roadway.

In an atomized air pressure pot system, the paint storage tank (also referred to as a "paint pot" or "pressure pot") is pressurized up to approximately 120 lbs. of pressure. This pressure forces the paint from the tank and out through the paint gun. In the paint gun of an atomized air system, air is mixed with the paint at the nozzle and creates the paint line on the roadway. A pressure pot system does not utilize a pump to move the paint like the airless system.

Because an aspect of the present invention involves repeatedly weighing one or both of the paint and bead storage tanks, the present invention is not limited by the type of system being employed and is suitable for use with both airless and atomized air systems.

To better appreciate the value of the present invention, some background on how pavement striping jobs are normally specified and bid is provided. There is usually a specific amount of paint and beads that one is required to apply per foot to meet the manufacturer's and owner's specification. An example of a common specification is 300 lineal feet of a 4 inch wide paint line and 6 lbs. of beads per gallon of paint. Many contractors doing striping work, however, rely on nothing more than intuition and experience to determine the quantities of paint and beads they are applying.

Further, because there are many opportunities for unscrupulous contractors to cheat (for example, if a contractor has not been applying enough paint or beads figures this out at the end of the day when he has more paint left in his tank than he should, he has an incentive to dump the extra paint or apply extra paint at the end of the day so that when the state Department of Transportation ("DOT") official checks how much paint was used it appears that the amount the specification called for was used), it would be highly beneficial if a device or method existed so that a contractor could more closely monitor the amount of paint being applied. In addition to the obvious benefits to the contractor of actually knowing the quantities of materials being used, he could provide a written record of this information to the DOT or whatever other agency specified the job to prove compliance with the specification.

Environmental factors and other conditions can also affect the amount of paint being used. Temperature variations affect both atomized air and airless systems. When temperatures are relatively colder, paint does not flow as well and thus it is possible that less paint than the specification calls for will be applied to the roadway. Also, over the course of a day, the ambient temperature tends to change. As the temperature rises or falls, the amount of paint being applied can change. In addition, when the glass beads sit overnight they can collect moisture as a result of condensation. This excess moisture can cause the beads not to flow as well as they would when they were dry. Both pressure pot and airless systems also utilize filters. The filters are prone to clog to varying degrees. When this occurs the amount of paint being applied to the roadway is reduced.

All of the above conditions may occur in the course of a single project. Being able to more accurately monitor the amount of paint and/or beads being applied allows the contractor to immediately make adjustments to compensate for such conditions rather than his finding out at the end of the day that he has been applying to little paint to meet the specification for much of the day because one of the paint-gun filters clogged early in the day.

Other factors which can affect the amount of paint being used include the pressure at which the paint is being applied to the surface of the pavement and the speed of the paint truck.

Yet another benefit of constantly monitoring paint and/or bead usage would be that the contractor could accurately determine when the supply of paint and/or beads in the tanks on the truck will run out. That is important because in many situations the tanks on the painting truck can not readily be refilled. For example, on interstate highways, safety regulations prohibit filling the paint and or bead tanks on paint trucks on the interstate highway. The paint truck must exit the interstate prior to refilling its tanks. If a contractor knows that the paint and/or bead supply is running low, he or she can exit the interstate at a convenient time prior to running out of paint and/or beads. If the contractor runs out he has to drive to the next exit, get refilled, then backtrack far enough to get back to the point where he ran out. This results in a waste of time. The problem of such inefficiencies—and how they are magnified—becomes clear when one appreciates that a paint truck must always operate with several other traffic control vehicles. So it is not one, but several vehicles which must backtrack in these circumstances.

Beyond experience and intuition, certain other devices and methods exist in the prior art for monitoring the amount of materials being used. For both beads and paint tanks, one can measure the amount of materials used to refill the tanks. Whatever volume of materials were used is then divided into the number of lineal feet painted since the last refilling stop to determine material usage. A second method is to use a tape measure to measure the amount the tank holding the material has dropped over a certain distance.

Since one knows the dimensions of the tank he or she can perform calculations to approximate the usage of materials.

Another method entails the use of flow meters, which can be placed in the lines connecting the paint tanks to the discharge nozzles. However, numerous disadvantages arise with flow meters. First, they restrict the flow of paint through the connecting line or lines and, as a result, the truck must be driven at slower speeds. A second problem is that flow meters can only be used with "atomized air" systems and not with "airless" systems. Finally, because flow meters are designed to monitor flow of liquids, they are generally not suitable for measuring the amount of beads being used.

Yet another method that can be used with "airless" systems is to count the strokes of the piston pump with a counter. The number of strokes can be converted to gallons, but the accuracy of counter systems starts to decline when pump packing and seals start to wear.

Another problem that arises when one tries to determine materials usage by measuring how much material has been used from a tank in a "pressure pot" system is that all of the pressure in the tank must be dissipated prior to opening the tank. This depressurization and re-pressurization is inconvenient and time-consuming.

SUMMARY

The present invention allows the realtime or near-realtime monitoring of paint and bead usage. It does this by continually re-weighing the paint and bead tanks. In presently preferred embodiments, a change in the weight of the tank of as little as two lbs. can be detected. For example, a gallon of paint weighs approximately thirteen lbs. Using a common specification in the industry, a gallon of paint being applied in a 4" wide paint line should cover 300'. Six pounds of beads should be applied per gallon of paint. A typical speed of the paint truck is fifteen mph. Given these values, approximately 1320 linear feet of a 4" wide paint line are being painted per minute.

In one aspect the invention is an apparatus for monitoring the amount of material being applied to a surface. The apparatus includes a weight-measurement device that generates an electronic signal representative of the weight of the material in a tank at a first time point and at a second time point different from the first time point and a microprocessor, wherein the processor is programmed to receive the electronic signal from the weight-measurement device and calculate the amount of material being applied to a surface by determining the amount of material used between the first time point and the second time point.

In a second aspect, the invention is a device for applying at least one of a pavement marking material and beads to a roadway. The device includes a first tank for the pavement marking material, and a first weight measurement device that generates a first electronic signal representative of the weight of the pavement marking material in the first tank at a first time point and at a second time point different from the first time point. The device also includes a second tank for the beads, and a second weight measurement device that generates a second electronic signal representative of the weight of the beads in the second tank at a first time point and at a second time point different from the first time point. The device also includes a timing device controlling at least one gun for applying pavement marking material to the roadway and at least one gun for applying beads to the roadway. The timing device generates a third electronic signal representative of the amount of pavement marking material and beads applied to roadway between the first time point and the second time point. The device also includes a microprocessor programmed to receive the first, second and third electronic signals and display at least one of the following on a display device:

the total amount of pavement marking material being applied to the roadway;

the total amount of beads drawn from the second tank per unit amount of pavement marking material drawn from the first tank;

the linear feet of pavement marking material applied to the roadway; and the total linear feet of pavement marking material applied to the roadway per unit amount of pavement marking material drawn from the first tank.

In a third aspect, the invention is a method for monitoring the amount of material being applied to a surface. The method includes the steps of:

generating a first electronic signal representative of the weight of the pavement marking material in a first tank at a first time point and at a second time point different from the first time point;

generating a second electronic signal representative of the weight of the beads in a second tank between the first time point and at the second time point;

generating a third electronic signal representative of the amount of pavement marking material and beads applied to roadway between the first time point and the second time point;

transmitting the first, second and third electronic signals to a processor; and displaying an output of the processor on a display device.

In a fourth aspect, the invention is a computer-readable article of manufacture containing program code that, when executed by a processor, causes the processor to:

receive a first electronic signal representative of the weight of the pavement marking material in a first tank at a first time point and at a second time point different from the first time point;

receive a second electronic signal representative of the weight of the beads in a second tank between the first time point and at the second time point;

receive a third electronic signal representative of the amount of pavement marking material and beads applied to roadway between the first time point and the second time point;

calculate at least one of the following and transmit a representative calculated value to a display device:

the total amount of beads drawn from the second tank per unit amount of pavement marking material drawn from the first tank;

the linear feet of pavement marking material applied to the roadway; and the total linear feet of pavement marking material applied to the roadway per unit amount of pavement marking material drawn from the first tank.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
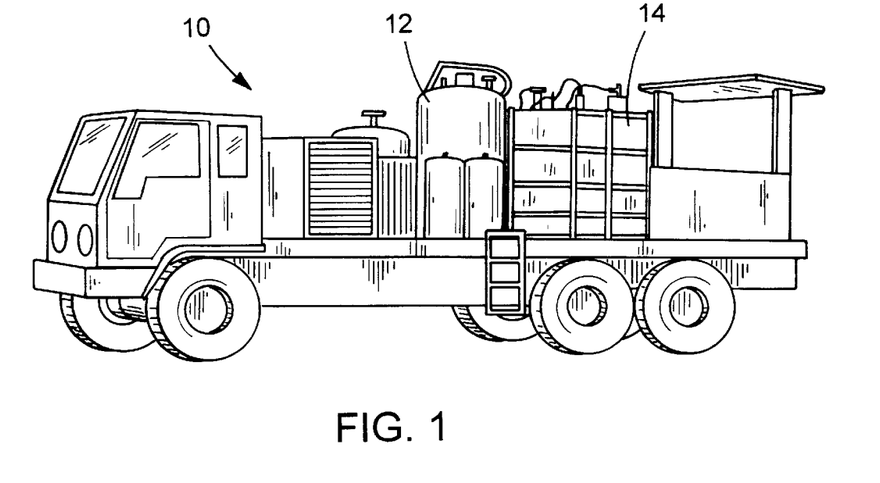
FIG. 1 is a perspective view of an embodiment of the present invention.

Referring to FIG. 1, and embodiment of the invention is shown that includes a generally cylindrical paint tank 12 is mounted on weigh bars on paint truck 10. A generally rectangular bead tank 14 is also mounted on weigh bars on the paint truck 10.

Figure 2:
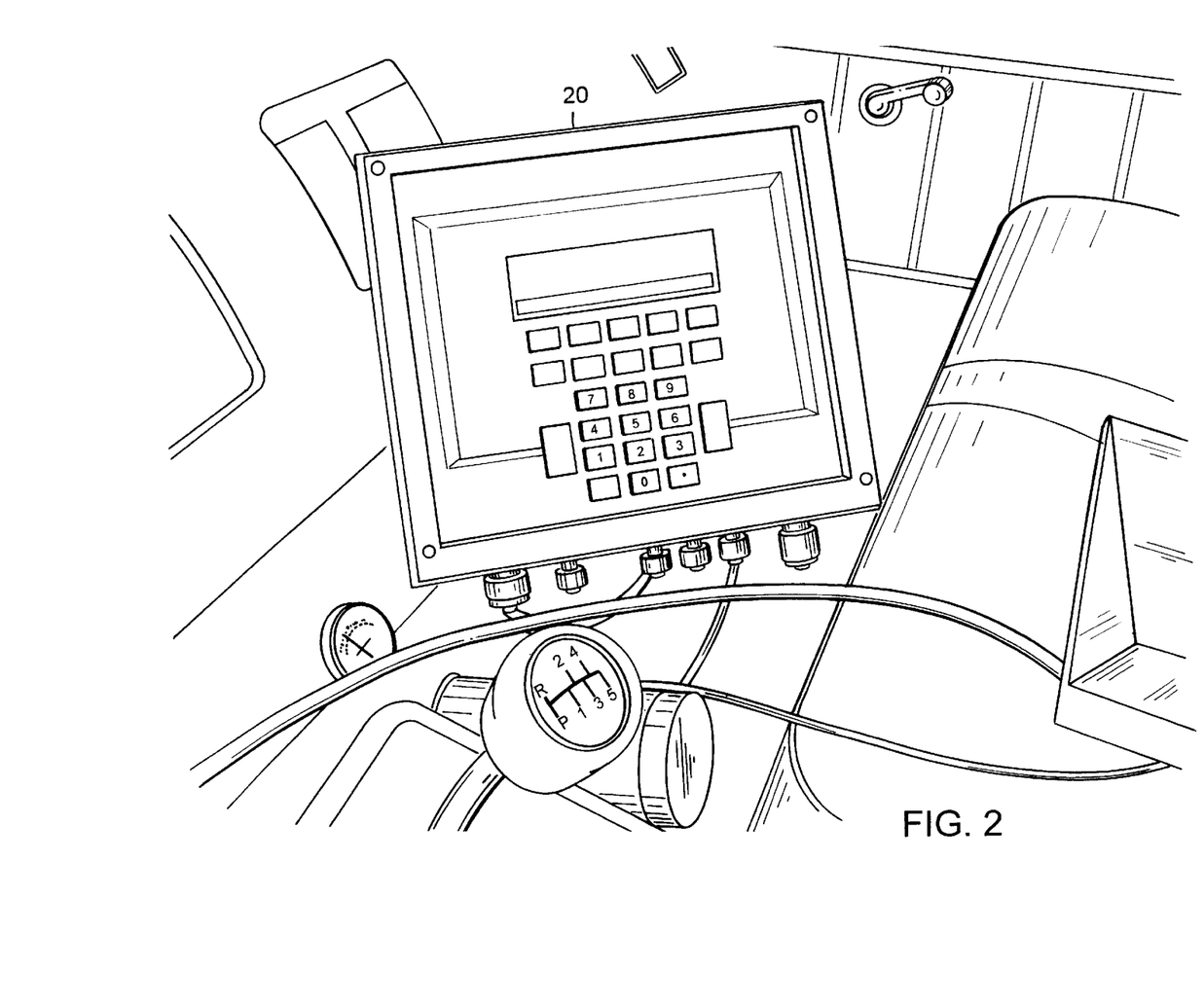
FIG. 2 is a view of the weigh-bar indicator mounted in the cab of a paint truck.

FIG. 2 depicts the weigh-bar indicator shown generally by the reference numeral 20 mounted inside the cab of paint truck 10. Weigh-bar indicator 20 is programmable and includes a microprocessor that may be instructed to monitor, collect, display and control a variety of desired information.

In the presently preferred embodiment, the tanks 12, 14 are mounted on weigh bars. A weigh bar is a device that is fixed at one end and flexes under an applied load. Strain gauges on the bar transform this physical change into voltage values. A suitable weigh bar for use in the invention is available from Weigh-Tronic, Inc., Fairmont, Minn. However, a variety of other weight-measurement devices may be used to provide an accurate measurement of the weight of the tank.

Figure 3:
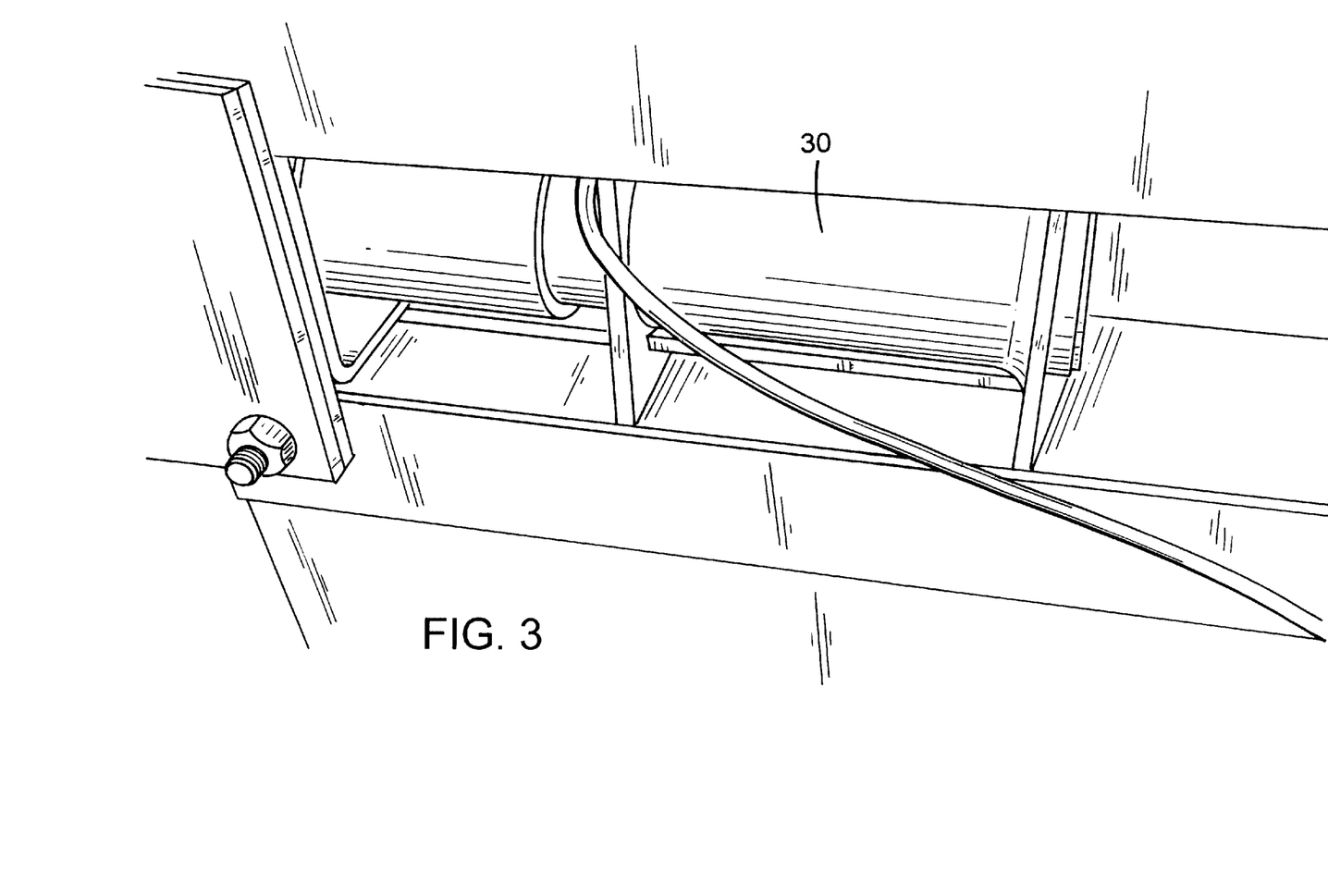
FIG. 3 is a view of a weigh bar mounted to the frame of a paint truck.
Figure 6:
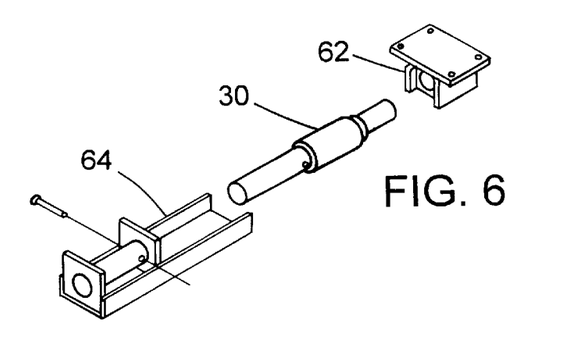
FIG. 6 is a perspective view of a weigh bar.

FIG. 3 depicts weigh bar 30 mounted to the frame of the paint truck 10. FIG. 6 depicts weigh bar 30 in conjunction with a tank support bracket 62 and a mounting bracket 64.

In the preferred embodiment of the present invention, circular or round material tanks such as that shown by element 12 of FIG. 1 are used, although tanks with any shape would be suitable for paint and/or beads. When round tanks are used a configuration of three weigh bars can be mounted underneath the tank to determine the weight. It has been found that using three weigh bars is the best way to accurately measure the tank weight. With square or rectangular tanks it is presently preferred to use four weigh bars, one at each corner of the tank.

Figure 4:
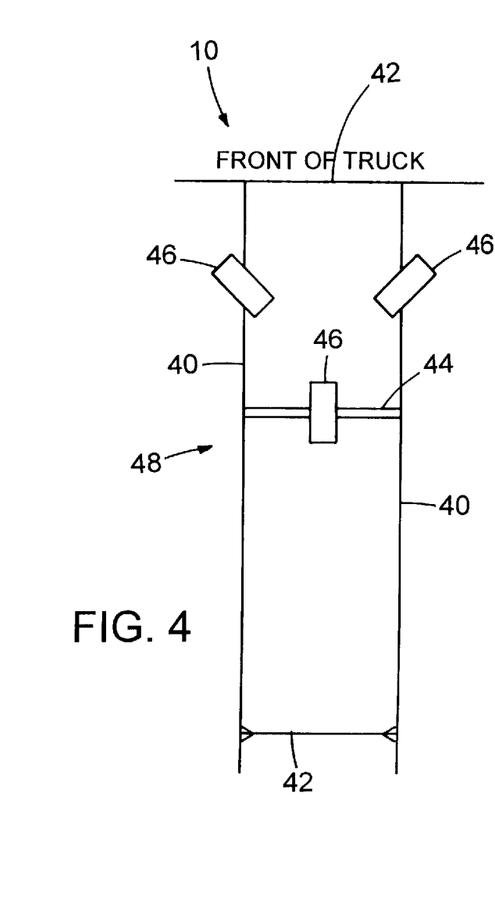
FIG. 4 is a cross-sectional perspective view of the frame of the paint truck depicting the attachment of a round tank to the frame.
Figure 5:
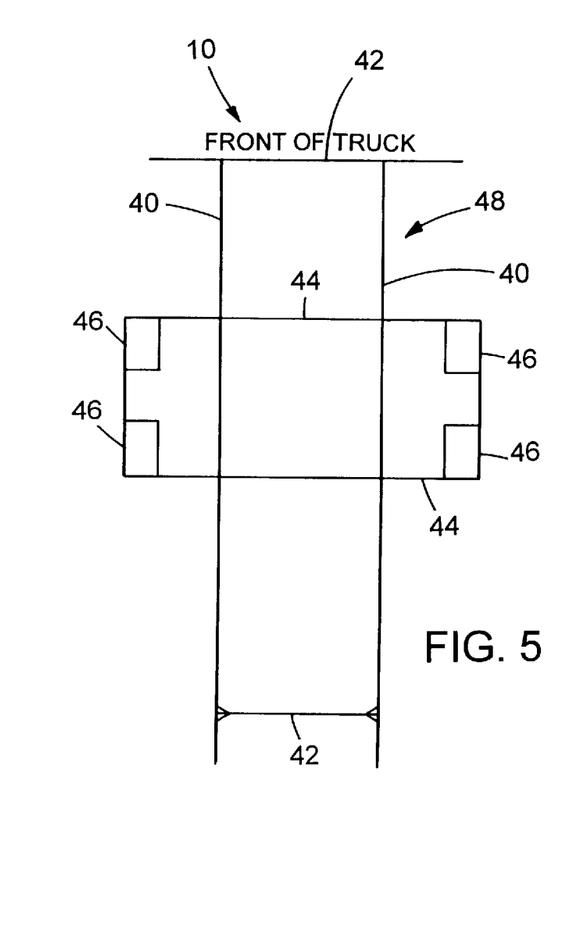
FIG. 5 is a cross-sectional perspective view of the frame of the paint truck depicting the attachment of a rectangular tank to the frame.

FIGS. 4 and 5 show how round (FIG. 4) and rectangular (FIG. 5) tanks are mounted to the frame of paint truck 10. Referring to FIG. 4, the frame of paint truck 10 is referenced generally by reference numeral 48 and more specifically by longitudinal members 40 and transverse members 42. An additional transverse member 44 is added to provide support to frame 48 and to provide location on which one of flanges 46 can be mounted. Three flanges 46 are mounted to frame 48 in a generally circular configuration. Mounting brackets 64 (FIG. 6) attach to flanges 46.

Referring to FIG. 5, frame 48 includes longitudinal members 40 and transverse members 42. Two additional transverse members 44 are added to provide support for frame 48 and to provide locations on which to mount flanges 46. Four flanges 46 are mounted as shown. Mounting brackets 64 (FIG. 6) attach to flanges 46.

Figure 7:
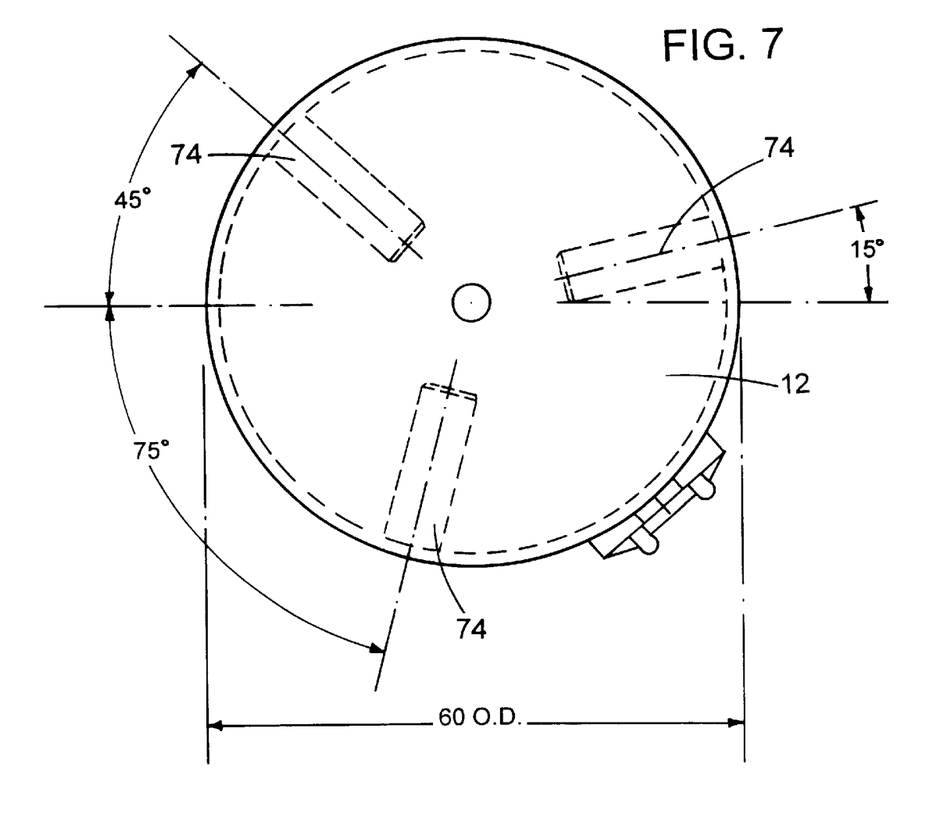
FIG. 7 is a bottom view of a round paint tank.

FIG. 7 is a bottom view of round tank 12. Flange 74 is attached to round tank 12. Support bracket 62 (FIG. 6) attaches to flange 74, thereby securing round tank 12 to weigh bar 30.

The voltage values gathered by the weigh bars at each tank are translated into weight readings by a processor such as a weigh-bar indicator. FIG. 2 depicts a weigh-bar indicator mounted in the cab of paint truck 10. The weigh-bar indicator translates the voltage values into weight readings and displays that information. The weigh-bar indicator includes a microprocessor that allows an operator to program the system to manipulate the voltage values from the weigh bars to calculate information for the operator. The weigh-bar indicator preferably filters and/or averages over time the data it receives from the tanks to compensate for the movement of the paint and/or the glass beads in the tank as the paint truck drives down the road. A suitable weigh-bar indicator is the WI-130, also manufactured by Weigh-Tronix, Inc, Fairmont, MN, although other similar devices could be used in the invention.

In another aspect of the invention, the number of feet being painted per gallon of paint may be calculated. A skipline controller may be used to monitor the distance a paint truck travels. The skipline controller counts the feet of surface painted by one or more paint guns and keeps a running total of the feet of surface painted. The skipline controller also may set a cycle, which is the length from the beginning of one skip to the beginning of the next and the length of the paint line and the gap between paint lines. A suitable skipline controller that may be used in the invention is the MDSi CS88 and DL-3 Datalogger, which are available from Micro Systems Development, Inc., Dayton, Ohio. For example, a typical cycle is 40 feet with a 10 foot strip and a 30 foot gap.

The information from the skipline controller can also be provided to a processor, such as, for example, the Weigh-bar indicator. The processor may be programmed to generate and display other useful information such as the number of feet of roadway being painted per gallon of paint.

Figure 8:
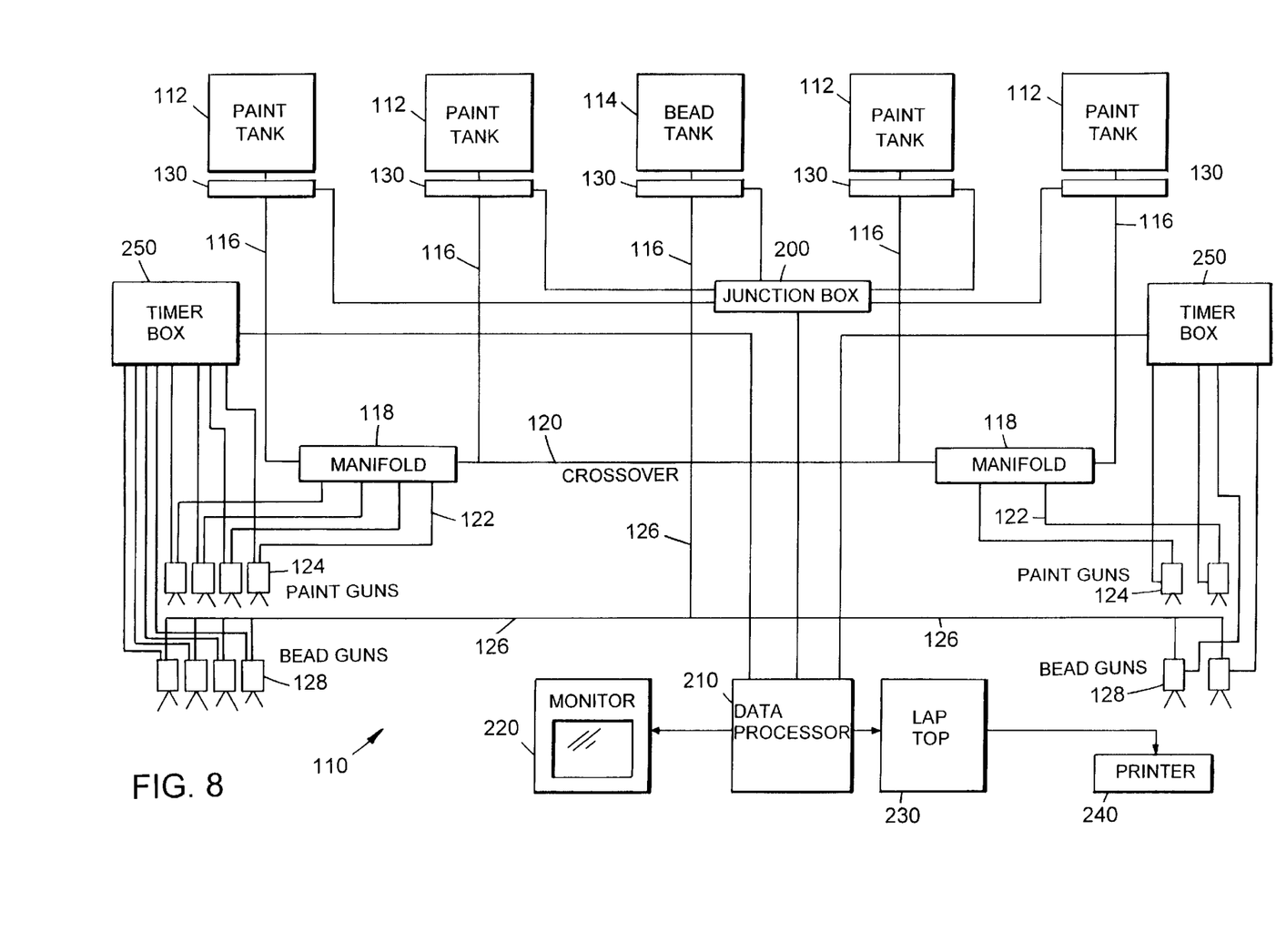
FIG. 8 is a schematic representation of a system of the invention.

An embodiment of an apparatus of the invention is shown schematically in FIG. 8. The system 110 includes a series of paint tanks 112, as well as one bead tank 114. Each of the paint tanks 112 and the bead tank 114 is weighed by a weigh bar 130. Paint flows out from the paint tanks 112 into a series of lines 116 and into a collection manifold 118. A crossover line 120 connects the collection manifolds 118. Paint from the collection manifolds 118 then flows through a series of lines 122 to a series of paint guns 124, where the paint is applied to the road surface. Beads flow out of the bead tank 114 through lines 126 to a series of bead guns 128, where the beads are applied to the road surface.

The electronic data signals from the weigh bars 130 are transmitted to a junction box 200, and then to a data processor 210. The processor 210 may be programmed with instructions to cause it to display data on a peripheral device such as a monitor 220 in the truck cab, the screen of a laptop computer 230. The processor may also be programmed with instructions to cause it to drive a printer 240 to generate a written report containing the data. The electronic data signals from a series of skipline controllers 250 are used to control the paint guns 124 and the bead guns 128. The electronic signals from the skipline controllers 250 are also provided to the data processor 210. These signals may be used to monitor information about the paint application process such as, for example, the distance traveled by the paint truck, the feet of surface painted by one or more paint guns, or a running total of the feet of surface painted. The skipline controller 250 also may set a cycle, which is the length from the beginning of one skip to the beginning of the next and the length of the paint line and the gap between paint lines.

It will be apparent to one of ordinary skill in the art that the correlation of the weight information from the weigh bars 130 and the timing information from the skipline controllers 250 may be input to the data processor 210. The processor may be instructed to generate a variety of useful data, based on these inputs such as, for example: (1) the pounds of beads being utilized; (2) the gallons of paint being utilized; (3) the pounds of beads being used per gallon of paint; and (4) the number of linear feet of roadway being striped per gallon of paint and/or pounds of beads used. The instructions to the processor may be provided as a computer readable article of manufacture such as a floppy diskette or a compact disc.

The information from the processor 210 may be displayed on the monitor 220 mounted in the cab of the paint truck right next to the operator. The output of the processor may also be used to drive a printer to generate a hard copy of the displayed data. This allows the operator to continuously monitor paint and/or bead usage and provide a permanent record of the activities for a particular vehicle over a specified time period.

A number of embodiments of the invention have been described. Nevertheless, it will be understood that various modifications may be made without departing from the spirit and scope of the invention. Accordingly, other embodiments are within the scope of the following claims.

What is claimed is:

1. A method for applying a pavement marking material and beads to a roadway, comprising:

providing at least one first tank for the pavement marking material, weighing the pavement marking material and generating a first electronic signal representative of the weight of the pavement marking material in the first tank at a first time point and at a second time point different from the first time point;

providing at least one second tank for the beads, weighing the beads and generating a second electronic signal representative of the weight of the beads in the second tank at a first time point and at a second time point different from the first time point;

providing the first and second electronic signals to a microprocessor;

displaying an output of the processor on a display device.

2. The method of claim 1, wherein the pavement marking material is weighed with weigh bars.

3. The method of claim 1, further comprising filtering the first and second electronic signals.

4. The method of claim 1, further comprising driving a printer by the output of the microprocessor.

5. The method of claim 1, wherein the display device is mounted in an area accessible by an operator of a vehicle.

6. The method of claim 1, further comprising controlling with a timing device at least one gun for applying pavement marking material to the roadway and at least one gun for applying beads to the roadway, generating with the timing device a third electronic signal representative of the amount of pavement marking material and beads applied to roadway between the first time point and the second time point, and providing the third electronic signal to the microprocessor.

7. The method of claim 6, further comprising programming the processor to display at least one of the following on a display device:

the total amount of pavement marking material being applied to the roadway;

the total amount of beads drawn from the second tank per unit amount of pavement marking material drawn from the first tank;

the linear feet of pavement marking material applied to the roadway; and the total linear feet of pavement marking material applied to the roadway per unit amount of pavement marking material drawn from the first tank.

8. A method for monitoring the amount of material being applied to a surface, comprising:

providing at least one first tank containing a pavement marking material;

weighing the first tank with at least one weigh bar under the first tank to determine the weight of the pavement marking material therein;

generating a first electronic signal representative of the weight of the pavement marking material in the first tank at a first time point and at a second time point different from the first time point;

providing at least one second tank containing reflective beads;

weighing the second tank with at least one weigh bar under the second tank to determine the weight of the beads therein;

generating a second electronic signal representative of the weight of the beads in the second tank between the first time point and at the second time point;

generating a third electronic signal representative of the amount of pavement marking material and beads applied to roadway between the first time point and the second time point;

transmitting the first, second and third electronic signals to a processor; and displaying an output of the processor on a display device.

9. The method of claim 8, further comprising filtering at least one of the first and second electronic signals.

* * * * *